US012781918B2

(12) United States Patent
Posselt et al.

(10) Patent No.: US 12,781,918 B2
(45) Date of Patent: Nov. 3, 2026

(54) STORAGE VESSEL AND CRYOGEN SUPPLY SYSTEM

(71) Applicant: Linde GmbH, Pullach (DE)

(72) Inventors: Heinz Posselt, Pullach (DE); Anton Wellenhofer, Pullach (DE); Eva Müller, Pullach (DE); Stefan Felbinger, Pullach (DE); Clemens Wolferstetter, Pullach (DE); Harald Zenz, Pullach (DE); Nabeel Hakemi, Pullach (DE); Petya Toneva, Pullach (DE); Denis Durnev, Pullach (DE); Johannes Schafranek, Pullach (DE)

(73) Assignee: Linde GmbH, Pullach (DE)

( * ) Notice: Subject to any disclaimer, the term of this patent is extended or adjusted under 35 U.S.C. 154(b) by 162 days.

(21) Appl. No.: 18/729,065

(22) PCT Filed: Jan. 11, 2023

(86) PCT No.: PCT/EP2023/025005
§ 371 (c)(1),
(2) Date: Jul. 15, 2024

(87) PCT Pub. No.: WO2023/138895
PCT Pub. Date: Jul. 27, 2023

(65) Prior Publication Data
US 2025/0164071 A1 May 22, 2025

(30) Foreign Application Priority Data
Jan. 20, 2022 (EP) .................................... 22020017

(51) Int. Cl.
*F17C 1/12* (2006.01)

(52) U.S. Cl.
CPC ........ *F17C 1/12* (2013.01); *F17C 2201/0109* (2013.01); *F17C 2203/0629* (2013.01);
(Continued)

(58) Field of Classification Search
None
See application file for complete search history.

(56) References Cited

U.S. PATENT DOCUMENTS 2,940,734 A * 6/1960 Harvey ..................... F17C 1/06 165/47
3,195,620 A * 7/1965 Steinhardt, Jr. ......... F25B 9/004 165/104.19
(Continued)

FOREIGN PATENT DOCUMENTS

CN 111022907 A * 4/2020 ................ F17C 1/00
DE 4320556 A1 12/1994
(Continued)

*Primary Examiner* — Jenna M Maroney
(74) *Attorney, Agent, or Firm* — Millen, White, Zelano & Branigan, PC; Brion P. Heaney

(57) ABSTRACT

A storage vessel for storing a cryogen, having an inner vessel for receiving the cryogen, an outer vessel which surrounds the inner vessel, and a heating device, which is at least partially arranged within the inner vessel, for introducing heat into the cryogen, wherein the heating device has a heating element for generating the heat and an outer casing which fluid-tightly surrounds an interior space of the heating device, wherein the heating element is accommodated within the interior space, and wherein the heating element has a heating wire which is embedded in a metal oxide which is encapsulated by a casing accommodated within the interior space.

18 Claims, 3 Drawing Sheets

(52) U.S. Cl.
CPC *F17C 2221/012* (2013.01); *F17C 2223/0161* (2013.01); *F17C 2227/0323* (2013.01); *F17C 2250/0439* (2013.01); *F17C 2265/06* (2013.01); *F17C 2270/0184* (2013.01)

(56) References Cited

U.S. PATENT DOCUMENTS

| | | | | | |
|---|---|---|---|---|---|
| 3,479,165 | A * | 11/1969 | Lyon | C01B 6/00 48/190 |
| 3,648,018 | A * | 3/1972 | Cheng | F17C 9/00 392/394 |
| 3,650,290 | A * | 3/1972 | Moen | F17C 13/025 137/339 |
| 3,827,246 | A * | 8/1974 | Moen | F17C 13/025 62/48.1 |
| 4,608,831 | A * | 9/1986 | Gustafson | F17C 3/08 62/48.1 |
| 4,739,634 | A * | 4/1988 | Watanabe | F25B 9/02 165/169 |
| 4,759,719 | A * | 7/1988 | Levenson | G09B 23/06 392/394 |
| 4,844,117 | A | 7/1989 | Sung | |
| 4,881,493 | A * | 11/1989 | Riba | F22B 1/284 392/459 |
| 4,978,832 | A * | 12/1990 | Rubin | F17C 13/026 392/453 |
| 5,881,207 | A * | 3/1999 | DeBourg | F22B 37/78 392/401 |
| 6,336,332 | B1 * | 1/2002 | Cohu | F17C 9/02 62/48.4 |
| 10,221,816 | B2 * | 3/2019 | Perez | B60K 6/24 |
| 12,305,808 | B2 * | 5/2025 | Ahn | F17C 1/12 |
| 2004/0251007 | A1 * | 12/2004 | Toh | F17C 1/00 165/157 |
| 2015/0034169 | A1 * | 2/2015 | Deshpande | F17C 13/00 137/227 |
| 2019/0368660 | A1 * | 12/2019 | Tamburello | F28F 1/24 |
| 2021/0299977 | A1 * | 9/2021 | Hatta | F17C 1/02 |

FOREIGN PATENT DOCUMENTS

| | | | | |
|---|---|---|---|---|
| DE | 102021104476 | A1 * | 9/2021 | B29C 35/0272 |
| EP | 0 997 682 | A2 | 5/2000 | |
| EP | 2987727 | A1 * | 2/2016 | B64D 25/16 |
| FR | 3139878 | A1 * | 3/2024 | F17C 1/02 |
| WO | 2021213501 | A1 | 10/2021 | |
| WO | WO-2023138895 | A1 * | 7/2023 | F17C 1/12 |
| WO | WO-2024088561 | A1 * | 5/2024 | F17C 9/02 |
| WO | WO-2025003892 | A1 * | 1/2025 | F17C 13/126 |

* cited by examiner

STORAGE VESSEL AND CRYOGEN SUPPLY SYSTEM

The invention relates to a storage vessel for storing a cryogen and a cryogen supply system having at least one such storage vessel.

Storage vessels for liquid hydrogen can have a pressure building vaporizer, according to the in-house know-how, which makes it possible to build up a pressure within the storage vessel so that gaseous hydrogen can be made available to a consumer, for example, in the form of a fuel cell, with a stable supply pressure of, for example, 1 to 2.5 bara. Such storage vessels are substantially cylindrical or barrel-shaped. The pressure building vaporizer is configured to supply gaseous hydrogen to the storage vessel. The gaseous hydrogen can be obtained, for example, by vaporizing liquid hydrogen.

During the operation of such a storage vessel, for example, in the maritime field (offshore use), a movement of the storage vessel, for example, due to the swell, can make it very difficult to maintain stable operating conditions in the storage vessel so that the required supply pressure for the consumer can be kept constant. When the storage vessel moves, the liquid hydrogen in the storage vessel sloshes back and forth uncontrollably. This back and forth movement of the liquid hydrogen as the storage vessel moves is called “sloshing.”

In a pressure building vaporizer as mentioned above, the pressure within the storage vessel is built up by supplying gaseous hydrogen. As previously mentioned, gaseous hydrogen can be produced from liquid hydrogen using the pressure building vaporizer. This causes the pressure in a gas zone of the storage vessel to rise. The gas zone is arranged above a liquid zone. A phase boundary is provided between the gas zone and the liquid zone. The gas zone is formed by gaseous hydrogen. The gaseous hydrogen forms a gas phase. The liquid zone is formed by liquid hydrogen. The liquid hydrogen forms a liquid phase. The phase boundary is provided between the liquid phase and the gas phase. The gas phase can change to the liquid phase and vice versa. During operation of the storage vessel, a continuous transport or exchange of heat takes place between the gas phase and the liquid phase and vice versa.

The transport of heat from the warm gas phase to the cold liquid phase of hydrogen occurs slowly. This means that the liquid phase initially remains undercooled. Particularly in storage vessels for use in the maritime field, sloshing of the undercooled liquid phase leads to an uncontrolled pressure drop in the storage vessel because the warm gas phase condenses at the phase boundary due to the exchange of heat with the undercooled liquid phase. This can lead to undesirable pressure fluctuations within the storage vessel. Such pressure fluctuations can complicate process control and can lead to an undesirable shutdown of a hydrogen supply system with such a storage vessel. Hydrogen-powered fuel cells can be particularly sensitive to pressure fluctuations. As previously mentioned, these require a constant supply of gaseous hydrogen at a given supply pressure.

To ensure that no pressure fluctuations occur in the storage vessel, it is desirable to bring the gas phase and the liquid phase of the hydrogen into a saturation state. The use of in-house known pressure building evaporators can, on the one hand, lead to long residence times until a saturated state is reached between the gas phase and the liquid phase of the hydrogen in the storage vessel because the heat transfer from the warm gas phase to the undercooled liquid phase is much slower than if the liquid phase is heated directly. On the other hand, regulatory requirements for explosive cryogenic media such as hydrogen require a secondary barrier. Due to this secondary barrier, the pressure build-up by a pressure building vaporizer as mentioned above occurs slowly because the heating of the liquid phase occurs very slowly.

EP 0 997 682 A2 describes an apparatus for building up pressure in a storage vessel for cryogenic liquids having a housing which has at least one inlet opening for liquid and, in the interior, a heating device for evaporating liquid, as well as a vapor line arranged in an upper third of the housing for discharging vapor bubbles formed during evaporation, wherein a cross section of the vapor line is large enough that, during operation of the apparatus, more vapor than liquid is discharged through the vapor line.

Against this background, the object of the present invention is to provide an improved storage tank.

Accordingly, a storage vessel for storing a cryogen is proposed. The storage vessel comprises an inner vessel for receiving the cryogen, an outer vessel which surrounds the inner vessel, and a heating device, which is at least partially arranged within the inner vessel for introducing heat into the cryogen, wherein the heating device has a heating element for generating the heat and an outer casing which fluid-tightly surrounds an interior space of the heating device, wherein the heating element is accommodated within the interior space, and wherein the heating element has a heating wire which is embedded in a metal oxide which is encapsulated by a casing accommodated within the interior space.

Because the heating element is accommodated in the interior space of the outer casing, it is advantageously possible to create a separate pressure chamber for the heating element within the outer casing. The outer casing seals the heating element in particular fluid-tightly from an atmosphere or surroundings of the storage vessel, from a vacuum space arranged between the inner vessel and the outer vessel, and from the cryogen. This avoids direct contact between the heating element and the cryogen inside the inner vessel. Nevertheless, the heating device advantageously allows direct heating of a liquid phase of the cryogen.

The cryogen is preferably hydrogen. The terms, “cryogen” and “hydrogen,” are therefore interchangeable as desired. In principle, however, the cryogen may also be any other cryogen. Examples of cryogenic fluids or liquids, or cryogens for short, are, in addition to the aforementioned hydrogen, liquid helium, liquid nitrogen, or liquid oxygen. A “cryogen” is thus to be understood in particular as a liquid. The cryogen can therefore also be referred to as a cryogenic liquid. The cryogen can be vaporized and thus converted into a gaseous phase. After vaporization, the cryogen is a gas or can be referred to as gaseous or vaporized cryogen. The term “cryogen” can thus comprise both, namely the gas phase and the liquid phase. As mentioned before, the liquid phase can also be called cryogenic liquid. The term “vaporized cryogen” here refers preferably only to the gas phase of the cryogen.

A gas zone, in particular in the inner vessel of the storage vessel, and an underlying liquid zone are formed in the storage vessel after or while filling the cryogen into the storage vessel. The storage vessel surrounds an interior space, receiving space or cavity for receiving the cryogen. The gas zone and the liquid zone fill the interior space. In particular, the heating device is placed within the interior space of the inner vessel at least in portions. A phase boundary is provided between the gas zone and the liquid zone. After entering the storage vessel, the cryogen thus preferably has two phases with different aggregate states, viz., liquid and gaseous. The liquid-state phase can transition into the gaseous phase, and vice versa. The liquid phase can be referred to as a liquid phase. The gaseous phase can be referred to as a gas phase. A purely liquid filling of the storage vessel is also possible.

The pressure prevailing in the storage vessel is preferably about 3.5 bara. The pressure prevailing in the storage vessel is in particular constant. The storage vessel is in particular suitable for supplying a consumer with the gaseous phase or the liquid phase of the cryogen at a suitable supply pressure and a suitable temperature. The consumer can be a fuel cell. In the present case, a "fuel cell" is in particular understood to mean a galvanic cell that converts the chemical reaction energy of a continuously supplied fuel—in the present case, hydrogen—and of an oxidant—in the present case, oxygen—into electrical energy. The cryogen is supplied to the consumer itself in particular in gaseous form. This means that the cryogen is completely vaporized or heated before the consumer or upstream from the consumer if the gaseous phase is supplied directly from the storage vessel. For example, the cryogen is supplied to the consumer with a supply pressure of 1 to 2.5 bara and a temperature of +10° C. to +25° C. However, the supply pressure can also be up to 6 bara.

The storage vessel is preferably assigned a central axis or axis of symmetry with respect to which the storage vessel is built substantially rotationally symmetrical. In cross section, the storage vessel can therefore have a circular or annular cross section. In contrast, however, the storage vessel can also be oval or elliptical in cross section. In particular, the inner vessel and the outer vessel are each built rotationally symmetrical in relation to the axis of symmetry. The inner vessel and the outer vessel each comprise a tubular base section which is rotationally symmetrical in relation to the axis of symmetry. The inner vessel and the outer vessel are each sealed fluid-tightly at the front with a first cover section and a second cover section. The inner vessel and the outer vessel are in particular fluid-tight. The inner vessel and the outer vessel can, for example, be made of a metallic material, in particular stainless steel. The inner vessel is arranged completely inside the outer vessel. This means in particular that the outer vessel completely surrounds the inner vessel.

The heating device can be led from the surroundings of the storage vessel through the outer vessel and the inner vessel into the inner vessel, in particular into the liquid zone of the inner vessel. For this purpose, the heating device can, for example, be passed through the respective first cover sections of the inner vessel and the outer vessel. In particular, the heating device is placed below the phase boundary in the liquid zone so that the heating device is always surrounded or flushed by the liquid phase of the cryogen. The heating device is in particular designed to introduce heat directly into the liquid phase of the cryogen. By introducing heat into the cryogen, it is at least partially vaporized, whereby a pressure build-up can be achieved within the storage vessel, in particular within the inner vessel.

The heating element is preferably a heating wire or a heating cable, or comprises a heating wire or a heating cable. In particular, the heating element is an electrical heating element. Preferably, the heating element converts electrical energy into heat. The fact that the outer casing is "fluid-tight" means in this case in particular that no fluid, in particular no liquid or no gas, can escape from the outer casing or enter the outer casing. The interior space is completely surrounded by the outer casing. The interior space can be arranged partly outside the storage vessel, i.e. in the surroundings, and partly inside the storage vessel, in particular inside the inner vessel. The outer casing is preferably made of a metallic material. For example, the outer casing can be made of stainless steel or an aluminum alloy.

Preferably, the heating device is operated in bubble-forming mode. This means in particular that the heating device is operated in such a way that bubbles of the vaporized cryogen rise from the heating device immersed in the liquid phase, which bubbles release heat to the liquid phase while rising until the bubbles rise from the liquid phase into the gas phase. This can be done by means of a suitable setting or regulation of the heating output of the heating device. Due to the operation in bubble-forming mode, film boiling around the heating device is avoided. No bubble formation occurs during film boiling. In this case, an undesirable layer of the heated liquid phase can form around the heating device, which acts as a heat-insulating liquid buffer. This can adversely affect the transfer of heat. By operating in bubble-forming mode, film boiling can be reliably prevented, which means that the transfer of heat from the heating device to the liquid phase is always ensured.

In contrast to the pressure building vaporizers mentioned above, the heating device is designed in such a way that if the outer casing leaks, the cryogen does not leave the outer casing. Explosion protection can be thereby achieved. An optional pressure monitoring system in the interior space can be used to detect leaks in the heating device. In this case, three different possible leaks can be detected. It is possible to always reliably detect leaks to the surroundings, leaks to a vacuum space arranged between the inner vessel and the outer vessel, and leaks to the inner vessel, in particular to the liquid zone. The heating device is explosion-proof. The heating device is also suitable for extremely cold temperatures. The additional outer casing allows the cryogen and the heating element to be safely separated from each other. The heating element therefore does not directly contact the cryogen, in particular the liquid phase.

The heating device is preferably assigned a central axis or axis of symmetry with respect to which the heating device is built substantially rotationally symmetrical. The heating device can be circular or cylindrical in cross section. However, this does not preclude that the heating device can be at least partially oval or elliptical in cross section. This means in particular that the heating device can have an oval cross section. In particular, the outer casing is rotationally symmetrical in relation to the axis of symmetry. With respect to the direction of gravity, the axis of symmetry of the heating device is placed below the axis of symmetry of the storage vessel. Accordingly, the axis of symmetry of the storage vessel is arranged above the axis of symmetry of the heating device with respect to the direction of gravity. The axis of symmetry of the heating device and the axis of symmetry of the storage vessel are arranged parallel to each other and at a distance from each other.

A metal oxide powder is preferably used as the metal oxide. Aluminum oxide and/or magnesium oxide are examples of metal oxides used. The casing is in particular metallic. Therefore, the casing can also be called a metallic casing or a metal casing. In particular, the casing is in particular non-current-carrying. The casing can accordingly be referred to as a non-current-carrying or non-conductive casing, in particular as a non-current-carrying or non-conductive metallic casing. The casing can be, for example, a stainless steel casing. The heating device is accordingly designed to be double-walled or double-encapsulated with the help of the outer casing and the casing arranged within the outer casing. The heating device can therefore be referred to as a double-walled or double-encapsulated heating device.

According to one embodiment, a storage vessel for storing a cryogen is proposed. The storage vessel comprises an inner vessel for receiving the cryogen, an outer vessel which surrounds the inner vessel, and a heating device, which is at least partially arranged within the inner vessel for introducing heat into the cryogen, wherein the heating device has a heating element for generating the heat and an outer casing which fluid-tightly surrounds an interior space of the heating device, wherein the heating element is accommodated within the interior space.

According to a further embodiment, the interior space is filled with a heat-conducting medium.

The heat-conducting medium can be a gas. The terms, "medium" and "gas" are therefore interchangeable as desired. Optionally, additional gas can also be added. The heat-conducting medium can also be or have a liquid. The heat-conducting medium can have a liquid phase, a solid phase and a gas phase. The heat-conducting medium can be part of the heating device. The heat-conducting medium is used to ensure heat conduction between the heating element and the outer casing of the heating device and therefore between the heating element and the liquid phase of the cryogen. An inert gas, for example, can be used as a suitable gas. The heat-conducting medium or gas can be helium. In particular, the heat-conducting medium should be selected such that no phase change of the heat-conducting medium occurs over the entire operating temperature range of the storage vessel. In particular, the heat-conducting medium should not freeze or freeze out. Alternatively, a phase change of the heat-conducting medium can be provided during operation of the heating device. This can be achieved by a suitable selection of the heat-conducting medium. A filling pressure and the heat-conducting medium are preferably selected such that, at a minimum temperature and a maximum temperature which can occur during operation of the storage vessel, there is a difference to an ambient pressure of the surroundings and to an operating pressure of the storage vessel. This previously mentioned difference makes it possible to reliably detect a possible leak between the liquid zone and the interior space of the outer casing, between the vacuum space and the interior space of the outer casing and/or between the surroundings and the interior of the outer casing. In case the cryogen is hydrogen, the heat-conducting medium is preferably helium. By using helium as a heat-conducting medium, the heat-conducting medium can be reliably prevented from freezing out when the storage vessel is operated with hydrogen. For example, any overpressure that allows leakage monitoring can be selected as the filling pressure for the interior space of the outer casing. Preferably, a pressure between 1.1 and 200 bar, in particular between 5 and 10 bar, is selected as the filling pressure. Monitoring the interior space therefore allows safety-related leak monitoring in order to meet the requirements for the separation of electrical systems and process systems and for separation from the surroundings in accordance with relevant regulations. The heating element can extend along a longitudinal direction of the storage vessel, which is oriented along the axis of symmetry.

According to a further embodiment, the heating device is guided from the surroundings of the storage vessel through the outer vessel and the inner vessel into a liquid zone surrounded by the inner vessel.

As previously mentioned, in the inner vessel, in addition to the liquid zone, the gas zone is arranged above the liquid zone. The heating device can be arranged at least partially in the gas zone or at least partially protrude into the gas zone. The gas zone and the liquid zone together fill the previously mentioned interior space, receiving space or cavity of the inner vessel for containing the cryogen. In particular, the heating device extends into the interior space of the inner vessel. Preferably, the heating device is arranged such that it is always arranged or placed within the liquid zone. In particular, with respect to the axis of symmetry of the storage vessel, the heating device is arranged below this axis of symmetry. The heating device is placed in particular in the region of a floor or underside of the inner vessel.

According to a further embodiment, the outer casing is guided through the outer vessel and the inner vessel, wherein the outer casing is connected to the outer vessel and the inner vessel in a material bond and/or form fit.

Given integrally bonded connections, the connection partners are held together by atomic or molecular forces. Material bonds are non-releasable connections which can only be separated by destroying the connecting means and/or the connection partners. For example, the outer casing is soldered or welded into the outer vessel and/or the inner vessel. Brazing is particularly suitable as a soldering process. The outer casing can also be glued to the outer vessel and/or the inner vessel. In particular, the outer casing is guided through one of the cover sections, in particular the first cover section, of the outer vessel and through one of the cover sections, in particular the first cover section, of the inner vessel, wherein the outer casing is materially bonded to the corresponding cover section. Additionally or alternatively, a form fit can be provided. A form fit is produced by the at least two connection partners engaging with each other or behind each other. For example, a screw connection and/or a flange connection can be provided. The outer casing can therefore be screwed and/or flanged to the outer vessel and the inner vessel.

According to a further embodiment, the outer casing has an end section which projects into the surroundings and is closed fluid-tightly by means of a removable closure element, wherein connection lines of the heating element are led through the closure element.

Preferably, the outer casing has a tubular base section which has a first end section at the end protruding into the surroundings and a second end section protruding into the inner vessel. The second end section is, for example, a lid that closes the base section at the front. The first end section protrudes into the surroundings and is sealed fluid-tightly by means of the closure element. The closure element can be plate-shaped, for example. While the closure element is removed, the heating element, for example, can be pushed into and pulled out of the outer casing. The heat-conducting medium can in principle also be filled in via the first end section. The closure element can, for example, be screwed to the first end section. The closure element can have holes or openings through which the connection cables of the heating element are passed. A sealing element, in particular in the form of an O-ring, can be provided between the first end section and the closure element.

According to a further embodiment, the outer casing has a connection projecting into the surroundings and is in fluidic communication with the interior space, wherein the connection is sealed fluid-tightly.

For example, the heat-conducting medium can be filled into the interior space of the outer casing via the connection. The connection can have a suitable valve for this purpose. The connection can also be used to monitor the pressure in the interior space. For this purpose, a sensor, in particular a pressure sensor, can be provided on the connection. The connection can have a plurality of different sensors such as pressure sensors, temperature sensors, optical sensors, sensors which are capable of detecting the cryogen and/or the heat-conducting medium, or the like.

According to a further embodiment, at least one heat transfer layer is provided on the outer casing, which is attached to the outside of the outer casing.

The heat transfer layer can be made of copper. Aluminum alloys are also possible as suitable materials for the heat transfer layer. The heat transfer layer can be a copper sheet or a copper plate. For example, the heat transfer layer is wound onto the outer casing. The heat transfer layer can be materially bonded to the outer casing. For example, the heat transfer layer is soldered onto the outer casing. The heat transfer layer can also be wound onto the outer casing and not materially bonded thereto, wherein two end sections of the heat transfer layer are clamped or screwed together to connect the heat transfer layer to the outer casing. The heat transfer layer ensures uniform heat transfer. A heat transfer plate can be molded onto the heat transfer layer. In this case, the heat transfer plate is formed with the aid of the two end sections of the heat transfer layer connected to each other. This means in particular that a first end section and a second end section abut one another and are connected to one another to form the heat transfer plate. The heat transfer plate can also be a separate component which is connected to the outer casing or the heat transfer layer. The heat transfer plate is preferably fin-shaped. Therefore, the heat transfer plate can also be called a heat transfer fin. A plurality of heat transfer plates can be provided on the outer casing or on the heat transfer layer. The heat transfer plate can be materially bonded to the outer casing or the heat transfer layer. For example, the heat transfer plate is soldered or welded to the outer casing or the heat transfer layer. With the help of the heat transfer plate, the heat transfer surface of the heating device can be increased. Furthermore, the heat transfer plate also ensures that when the liquid level of the cryogen in the storage vessel is low, at least the heat transfer plate protrudes into the liquid phase of the cryogen, and heat can accordingly be transferred to the liquid phase. The heat transfer plate is therefore always wetted by the liquid phase or immersed therein. This can prevent local overheating. Preferably, at least one heat transfer plate is attached between the outer casing and the inner vessel. Any number of heat transfer plates can be provided. The heat transfer plate is preferably made of a metal material with good heat conduction, such as a copper alloy or an aluminum alloy.

According to a further embodiment, the heating device has a support element which supports the heating element.

In particular, the support element is arranged entirely within the interior of the outer casing. The support element is preferably tubular. The support element can also be called a support tube. Preferably, the support element is made of a heat-conducting material. For example, the support element can be made of a copper alloy or an aluminum alloy. Steel, especially stainless steel, can also be used for the support element. Alternatively, the support element can also be made of glass, glass ceramic or ceramic. In this case, the support element itself is not thermally conductive, or at least not a good thermal conductor. In case the support element is made of an electrically conductive material, the heating element can have an insulating element which electrically insulates the heating element from the support element. In this case, the heating element can, for example, have an electrically conductive heating wire which is surrounded by the insulating element. For example, the above-mentioned heating wire can be embedded in magnesium oxide powder which is encapsulated by a non-current-conducting metallic casing, for example a stainless steel casing. In this case, the term “heating element” can therefore be understood to mean a metallic-mineral-insulated heating wire. The heating device can be attached to the support element in such a way that the heating device extends linearly along the support tube or the longitudinal direction. Alternatively, the heating element can also be wound onto the support element. The support element is optional. Alternatively, the heating element can also be accommodated in the outer casing without a support element.

According to a further embodiment, the support element has an outer side with a groove running helically around the support element, in which the heating element is accommodated at least in portions.

In this case, the heating element is wound onto the support element. The heating element is in particular elastically deformable. This means that the heating element can be wound onto the support element like a rope or wire without damage. The groove can also be described as spiral or snail-shaped. The groove can also be called a holding groove or receiving groove. The groove is optional. This means that the heating element can be wound onto the support element even without the groove. The groove is at least partially cylindrical in shape. The heating element has in particular a circular or round cross section. This ensures a flat contact between the heating element and the groove. This improves the transfer of heat from the heating element to the support element. The heating element and/or the support element in turn transfers heat to the heat-conducting medium, which transfers heat to the outer casing, which in turn transfers heat to the liquid phase of the cryogen in order to at least partially evaporate the liquid phase. The groove is optional. The heating element can also be wound onto the support element without the groove.

According to a further embodiment, a circumferential gap is provided between the support element and the outer shell around the circumference of the support element.

The gap is in particular part of the interior space of the outer casing. In particular, the gap is completely filled with the heat-conducting medium. In particular, the support element is placed in the center of the outer casing. For this purpose, for example, support feet can be provided which support the support element on the outer casing. The support feet are placed in the gap. The support feet are preferably poorly or not thermally conductive so that the heat from the heating element and/or the support element is preferably transferred to the outer casing only with the aid of the heat-conducting medium. This can prevent or at least reduce uneven temperature distribution on the outside of the outer casing. However, the support feet can also be thermally conductive. In particular, the gap prevents direct contact between the support element and/or the heating element and the outer casing. This can prevent local overheating, which could otherwise lead to damage to the heating device. In this context, “circumferential” means viewed along a circumferential direction of the heating device. The term “circumferential direction” is understood here to mean a rotational direction or spatial direction which is oriented around the axis of symmetry of the heating device. The gap is optional. The gap can be necessary for design reasons so that the support element with the wound heating element can be inserted into the outer casing. To ensure heat conduction to the outer casing, the heat-conducting medium is required. Alternatively, the support element can rest against the outer casing on the inside. The heat transfer can thereby be improved.

According to a further embodiment, the support element is tubular and has a cylindrical inner side.

As previously mentioned, the support element can also be called a support tube. The inner side can be realized, for example, with the aid of a hole or cutout extending through the entire support element. In particular, the support element has the cylindrical outer side in which the circumferential groove is provided. The inner side faces away from the outside of the support element.

According to a further embodiment, the heating device has at least one temperature sensor which is arranged within the support element.

The temperature sensor can also be referred to as a temperature pickup. The temperature sensor is placed in particular inside the interior space of the outer casing. A plurality of temperature sensors can be provided. The temperature sensor is suitable for temperature monitoring and/or functional control of the heating element. With the aid of the temperature sensor, the heating element can be prevented from overheating. Furthermore, with the aid of the temperature sensor, the amount of heat introduced into the liquid phase of the cryogen can also be detected and/or controlled.

According to a further embodiment, the heating device has a fastening element arranged within the support element for fastening the temperature sensor to the support element, wherein the temperature sensor is inserted into the fastening element.

The fastening element is in particular tubular or sleeve-shaped. Therefore, the fastening element can also be called a fastening tube or a fastening sleeve. In particular, the fastening element has a cylindrical outer surface which can rest against the cylindrical inner surface of the support element. For example, the fastening element is pressed into the support element. The fastening element furthermore comprises in particular a cylindrical inner surface which faces away from the outer surface. The inner surface can be realized, for example, by a hole or cutout running through the entire fastening element. The fastening element preferably has a receiving hole into which the temperature sensor is inserted. A plurality of receiving holes can be provided for a plurality of temperature sensors. The temperature sensor can be thermally coupled to the support element with the aid of a heat-conducting paste. The support element is preferably made of a heat-conducting material. For example, the support element is made of an aluminum alloy or a copper alloy. Because the temperature sensor is arranged inside the support element, it is possible to reduce the installation space of the heating device. In comparison to an arrangement in which the temperature sensor is provided on the outside of the support element, an interruption of contact surfaces between the support element and the heating element can advantageously be avoided. This can reliably prevent undesirable uneven temperature distribution along the heating element. The measurement of the temperature using the temperature sensor is preferably carried out substantially exclusively with the aid of heat conduction. In other words, the temperature sensor is not directly adjacent to the heating element. In order to measure the temperature of the heating element, the fastening element is made of a highly heat-conducting material. The fastening element preferably fills an entire space between the support element carrying the heating element and the temperature sensor.

According to a further embodiment, the fastening element is fluid-permeable.

This makes it possible for the heat-conducting medium to pass through the support element. This reliably prevents the formation of different pressure chambers within the outer casing. The support element can preferably have a central hole as mentioned above, which completely penetrates the support element. Alternatively, a plurality of individual holes can be provided. With the help of the support element, a space-saving temperature measurement is possible at any desired region of the heating element. Maximum heat transfer between the heating element and the temperature sensor is ensured. Furthermore, a defined safe contact between the heating element and the temperature sensor is ensured. The formation of two separate volumes or pressure chambers within the interior space of the outer casing is prevented by the fact that the support element is fluid-permeable. Compensating holes can be provided for this purpose. Compared to the heating element, the fastening element is preferably designed with a minimal wall thickness. This means that the time delay in temperature measurement can be kept small. The fastening element is manufactured to ensure good thermal contact with the support element. A fit between the fastening element and the support element is selected according to the minimum and maximum operating temperature and the employed materials so that sufficient pressure between the fastening element and the support element is ensured over the entire temperature range which occurs during operation of the storage vessel. The fastening element can be provided with an additional pre-tensioning device, in particular a screw tensioning device, in order to facilitate the installation of the fastening element. In an installed state, for example, two parts of the fastening element can be loosely inserted into each other and aligned. The fastening element can be provided with an additional internal clamping device which ensures a contact pressure between the fastening element and the support element over a wide temperature range. The clamping device can be combined with the pre-tensioning device.

Furthermore, a cryogen supply system for supplying a consumer with a cryogen is proposed. The cryogen supply system comprises at least one storage vessel as previously explained.

Alternatively, the cryogen supply system can comprise a plurality of storage vessels. The cryogen supply system can also be called a hydrogen supply system. In particular, this means that the terms "cryogen supply system" and "hydrogen supply system" can be used interchangeably. The consumer can be a fuel cell as mentioned above. The cryogen supply system can have an evaporator which is suitable for vaporizing liquid cryogen withdrawn from the storage vessel and supplying it to the consumer at the suitable supply pressure and a suitable temperature. The consumer can be part of the cryogen supply system. The cryogen supply system can be part of a vehicle, in particular a land vehicle, a watercraft or an aircraft.

The embodiments and explanations given for the storage vessel correspondingly apply to the cryogen supply system and vice versa.

In the present case, "a" is not necessarily to be understood as limiting to precisely one element. It is rather the case that several elements, such as two, three, or more, may also be provided. Any other number word used herein is also not to be understood as a limitation being given to precisely the number of elements mentioned. It is rather the case that, unless otherwise indicated, the number may deviate upwardly or downwardly.

Further possible implementations of the storage vessel and/or of the cryogen supply system also include not explicitly mentioned combinations of features or embodiments described above or below with respect to the exemplary embodiments. A person skilled in the art will also add individual aspects as improvements or additions to the respective basic form of the storage vessel and/or of the cryogen supply system.

Further advantageous embodiments and aspects of the storage vessel and/or the cryogen supply system are the subject of the dependent claims and of the embodiments of the storage vessel and/or the cryogen supply system described below. The storage vessel and/or the cryogen supply system are explained below in more detail with reference to the accompanying figures based on preferred embodiments.

In the figures, the same or functionally equivalent elements have been provided with the same reference signs unless otherwise indicated.

Figure 1:
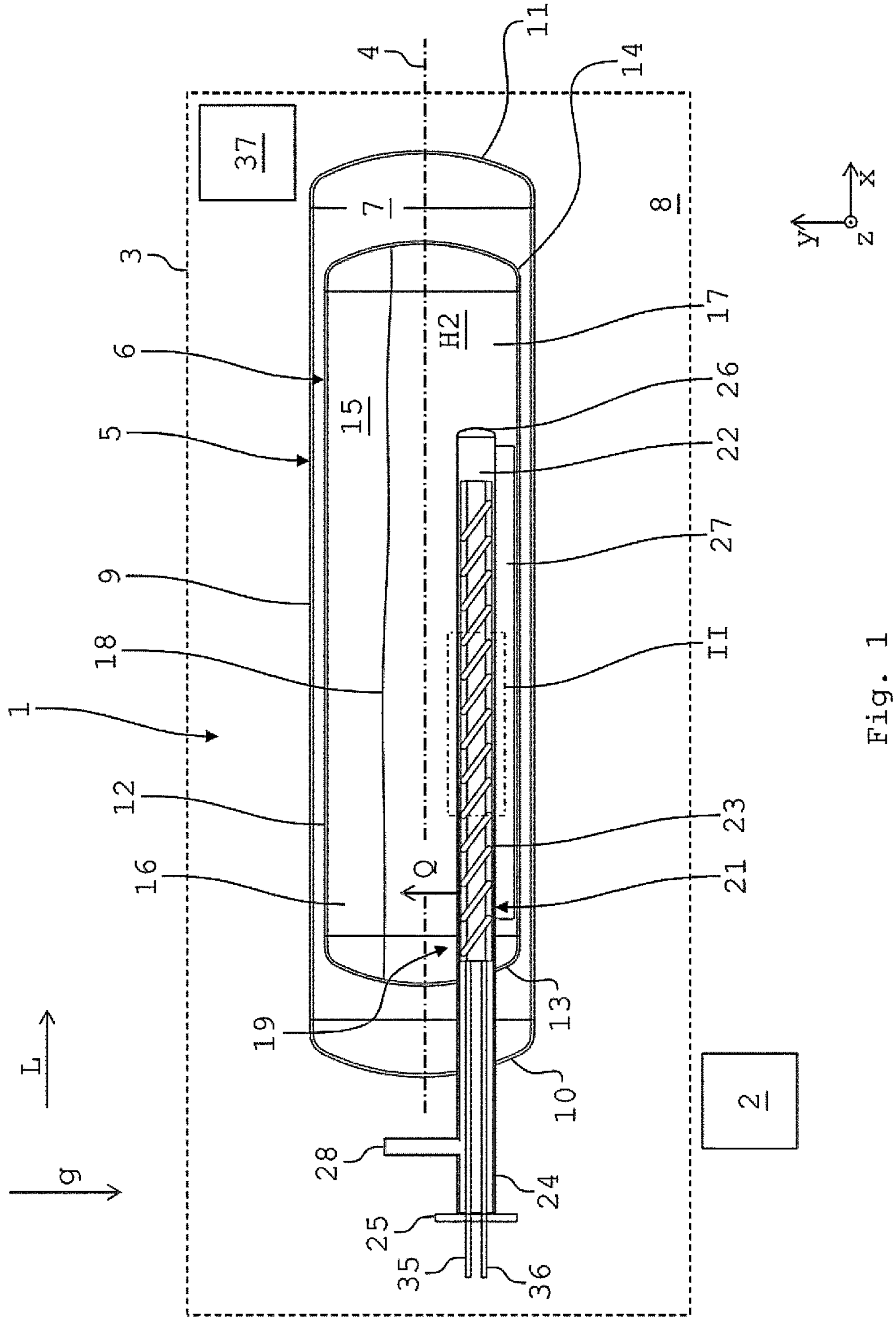
FIG. 1 shows a schematic sectional view of an embodiment of a storage vessel.
Figure 2:
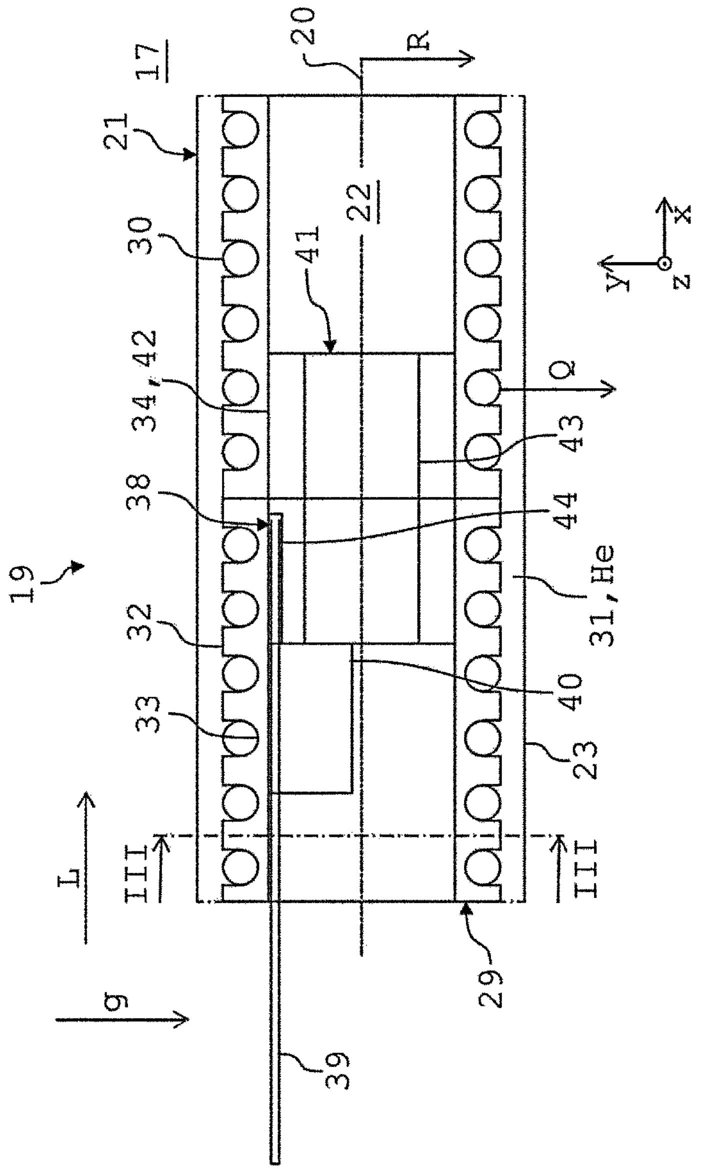
FIG. 2 shows the detailed view II according to FIG. 1.
Figure 3:
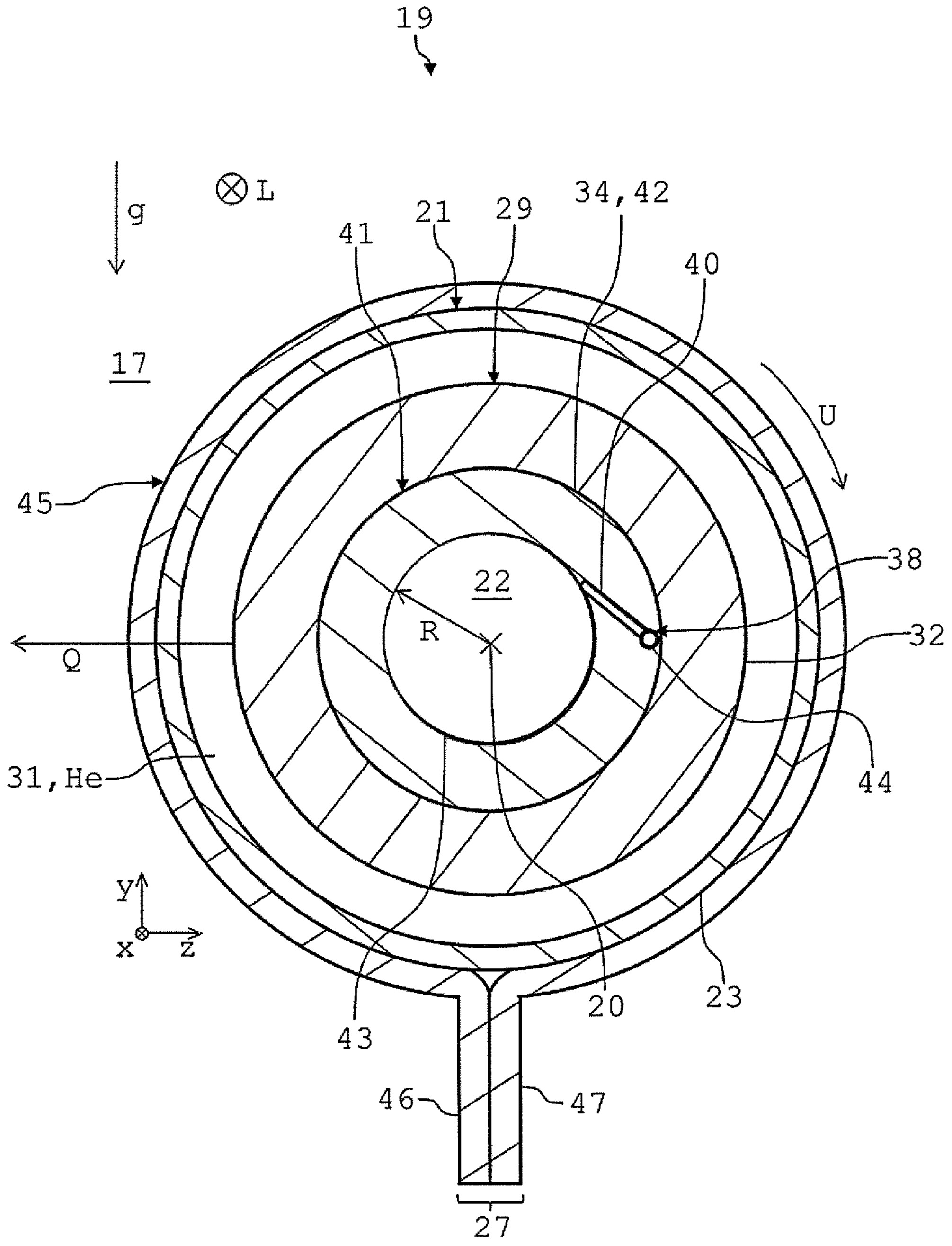
FIG. 3 shows a schematic sectional view according to the section line Ill-Ill in FIG. 2.

FIG. 1 shows a schematic sectional view of an embodiment of a storage vessel 1. FIG. 2 shows the detailed view II according to FIG. 1. FIG. 3 shows a schematic sectional view according to the section line Ill-Ill in FIG. 2. In the following, reference is made simultaneously to FIGS. 1 through 3.

The storage vessel 1 can also be referred to as a storage tank. The storage vessel 1 is suitable for accommodating liquid hydrogen H2 (boiling point 1 bara: 20.268 K=−252.882° C.). The storage vessel 1 can therefore also be referred to as a hydrogen storage vessel or as a hydrogen storage tank. However, the storage vessel 1 can also be used for other cryogenic liquids. Examples of cryogenic fluids or liquids, or cryogens for short, are liquid helium He in addition to the aforementioned liquid hydrogen H2 (boiling point 1 bara: 4.222 K=−268.928° C.), liquid nitrogen N2 (boiling point 1 bara: 77.35 K=−195.80° C.) or liquid oxygen O2 (boiling point 1 bara: 90.18 K=−182.97° C.).

The storage vessel 1 is suitable for use in or on a vehicle (not shown). The vehicle can be, for example, a maritime vessel, in particular a ship. The vehicle can be referred to as a maritime vehicle. In particular, the vehicle can be a maritime passenger ferry. Alternatively, the vehicle can also be a land vehicle. However, it is assumed below that the vehicle is a vessel.

The vehicle can have a consumer 2, in particular a fuel cell. In the present case, a "fuel cell" is understood to mean a galvanic cell that converts into electrical energy the chemical reaction energy of a continuously supplied fuel, in the present case hydrogen, and of an oxidant, in the present case oxygen. By means of the electrical energy obtained, an electric motor (not shown) can be powered, for example, which in turn drives a ship's propeller for propelling the vehicle. The storage vessel 1 is provided to supply the consumer 2 with hydrogen H2.

The storage vessel 1 can be part of a cryogen supply system 3 which is suitable for providing the consumer 2, which in the present case is preferably a fuel cell, with gaseous hydrogen H2 at a defined supply pressure and a defined supply temperature. For example, the hydrogen H2 is supplied to the consumer 2 in gaseous form at a supply pressure of, for example, 1 to 2.5 bara and a temperature of, for example, 0 to +70° C., in particular from +10 to +25° C. However, the supply pressure can also be up to 6 bara. The cryogen supply system 3 can be described as a hydrogen supply system. In addition to the storage vessel 1, the cryogen supply system 3 can comprise a vaporizer (not shown) which is suitable for vaporizing the liquid hydrogen H2 and supplying it to the consumer 2.

The storage vessel 1 is rotationally symmetrical with respect to a center axis or axis of symmetry 4. The axis of symmetry 4 can be oriented perpendicular to a direction of gravity g. This means that the storage vessel 1 is in a lying or horizontal position. Alternatively, the axis of symmetry 4 can be oriented parallel to the direction of gravity g. That is, the storage vessel 1 can also be positioned upright or vertically.

A coordinate system with a first spatial direction, length direction or x-direction x, a second spatial direction, height direction or y-direction y and a third spatial direction, depth direction or z-direction z is assigned to the storage vessel 1. The directions x, y, z are oriented perpendicularly to one another. The axis of symmetry 4 is placed parallel to the x-direction x. The storage vessel 1 is assigned a longitudinal direction L which can coincide with the x-direction x.

The storage vessel 1 comprises an outer vessel 5 which is rotationally symmetrical with respect to the axis of symmetry and an inner vessel 6 which is rotationally symmetrical with respect to the axis of symmetry 4. The inner vessel 6 is arranged completely inside the outer vessel 5. A vacuum space 7 is provided between the outer vessel 5 and the inner vessel 6, which is gap-shaped at least in portions. In the vacuum space 7, a negative pressure prevails compared to the surroundings 8 of the storage vessel 1. The surroundings 8 can also be referred to as the atmosphere. This means that the terms "surroundings" and "atmosphere" can be used interchangeably. An insulating element can be provided in the vacuum space 7, which at least partially or completely fills the vacuum space 7. The insulating element can have a multilayer insulation layer (MLI) or be designed as such. The outer vessel 5 and/or the inner vessel 6 can for example be made of stainless steel.

The outer vessel 5 comprises a tubular or cylindrical base section 9 which can have a rotationally symmetrical design in relation to the axis of symmetry 4. The base section 9 is closed at both end faces with the aid of a first cover section 10 and a second cover section 11. In cross section, the base section 9 can have a circular or approximately circular geometry. The cover sections 10, 11 are domed. The cover sections 10, 11 are domed in opposite directions so that the first cover section 10 and the second cover section 11 are domed outward in relation to the base section 9. The outer vessel 5 is fluid-tight, in particular gas-tight. The longitudinal direction L is oriented from the first cover section 10 towards the second cover section 11.

The inner vessel 6, like the outer vessel 5, comprises a tubular or cylindrical base section 12 which is rotationally symmetrical in relation to the axis of symmetry 4. The base section 12 is closed on both sides by a first cover section 13 and a second cover section 14. In cross section, the base section 12 can have a circular or approximately circular geometry. The cover sections 13, 14 are domed. In particular, the first cover section 13 and the second cover section 14 are domed in opposite directions so that the first cover section 13 and the second cover section 14 are domed outwards with respect to the base section 12. The outer vessel 6 is fluid-tight, in particular gas-tight. The outer vessel 5 and/or the inner vessel 6 can have a blow-off valve (not shown). The longitudinal direction L is oriented from the first cover section 13 towards the second cover section 14.

The liquid hydrogen H2 is accommodated in the inner vessel 6. The inner vessel 6 surrounds an interior space 15 in which the liquid hydrogen H2 is stored. As long as the hydrogen H2 is in the two-phase region, a gas zone 16 having vaporized hydrogen H2 and a liquid zone 17 having liquid hydrogen H2 can be provided in the inner vessel 6 or the interior space 15. After being filled into the inner vessel 6 or the interior space 15, the hydrogen H2 therefore has two phases having different aggregate states, namely liquid and gaseous. That is to say, in the inner vessel 6 or the interior space 15, there is a phase boundary 18 between the liquid hydrogen H2 and the gaseous hydrogen H2. The gas zone 16 and the liquid zone 17 together fill the interior space 15. The interior space 15 can be referred to as the vessel interior space.

The storage vessel 1 comprises a heating device 19. The heating device 19 is shown in sections in FIGS. 2 and 3. The heating device 19 is designed to introduce heat Q into the liquid hydrogen H2. The heating device 19 is operated electrically. Therefore, the heating device 19 can also be referred to as an electric heating device or as a heater, in particular as an electric heater. The heating device 19 projects through the first cover sections 10, 13 from the surroundings 8 into the inner vessel 6, in particular into the liquid zone 17. The part of the heating device 19 projecting into the inner vessel 6 or into the interior space 15 is preferably flushed by the liquid hydrogen H2 of the liquid zone 17.

The heating device 19 is rotationally symmetrical with respect to a center axis or axis of symmetry 20. The axis of symmetry 20 can be oriented parallel to the axis of symmetry 4. The axis of symmetry 20 is placed below the axis of symmetry 4 with respect to the y-direction y or the direction of gravity g. The heating device 19 is also assigned a radial direction R. The radial direction R is oriented to be perpendicular to the axis of symmetry 20 and away therefrom.

The heating device 19 comprises a fluid-tight outer casing 21. The outer casing 21 is tubular and can therefore also be referred to as an outer tube. The outer casing 21 is preferably made of a metal material, preferably of stainless steel. The outer casing 21 is preferably made of a material that conducts heat well. The outer casing 21 is guided through the first two cover sections 10, 13 into the liquid zone 17. This means that the outer casing 21 extends partially into the surroundings 8 and partially into the inner vessel 6, in particular into the liquid zone 17. The outer casing 21 can be soldered or welded into the first cover sections 10, 13. The outer casing 21 can also be made of a copper alloy, an aluminum alloy, glass, glass ceramic or ceramic.

The outer casing 21 is rotationally symmetrical in relation to axis of symmetry 20. The outer casing 21 can be circular in cross section. Alternatively, the outer casing 21 can also be slightly oval or elliptical in cross section. Viewed in a circumferential direction U, the outer casing 21 runs completely around the axis of symmetry 20. The outer casing 21 is therefore circumferentially closed. The circumferential direction U is oriented around the axis of symmetry 20 and along the outer casing 21. The outer casing 21 surrounds an interior space 22. The interior space 22 can be referred to as the interior space of the outer casing 21 or as the interior space of the heating device 19. The interior space 22 can also be referred to as the heating interior space. The interior space 22 is filled with a heat-conducting medium. The heat-conducting medium is preferably a gas, in particular helium He. The outer casing 21 is fluid-tight.

The outer casing 21 comprises a tubular base section 23 which is rotationally symmetrical with respect to the axis of symmetry 20. In addition to the base section 23, the outer casing 21 comprises a first end section 24 which projects into the surroundings 8 and is closed fluid-tight with the aid of a plate-shaped closure element 25. A second end section 26 is provided facing away from the first end section 24 and is lid-shaped and closes the base section 23 fluid-tightly at the front. The second end section 26 is placed within the liquid zone 17.

At least one heat transfer plate 27 can be provided on the outer casing 21, in particular on the base section 23, which extends in the radial direction R away from the base section 23. The heat transfer plate 27 serves to enlarge the surface so that the transfer of heat Q from the heating device 19 to the hydrogen H2 is improved. The heat transfer plate 27 is fin-shaped and can therefore also be referred to as a heat transfer fin. A plurality of heat transfer plates 27 can be provided.

Outside the outer vessel 5, the outer casing 21 has a connection 28 which can be closed fluid-tightly. With the help of the connection 28, for example, the interior space 22 can be filled with helium He. Furthermore, the connection 28 can also be used to monitor the heating device 19. For example, a pressure drop or pressure increase in the interior space 22 can be detected via the connection 28. The connection 28 is placed outside the storage vessel 1 in the surroundings 8.

In addition to the outer casing 21, the heating device 19 has a tubular support element 29 which carries a wire-shaped heating element 30. The support element 29 can also be called a support tube. The support element 29 is rotationally symmetrical in relation to axis of symmetry 20. The support element 29 is made of a material that conducts heat well. For example, the support element 29 is made of a metal material, in particular a copper alloy or an aluminum alloy. However, the support element 29 can also be made of glass, a glass ceramic or a ceramic.

The support element 29 can be an integral component, in particular a materially integral component. "Integral" or "one-piece" means that the support element 29 is a single component which is not composed of a plurality of subassemblies or components. In the present case, "materially integral" means in particular that the support element 29 is made entirely of the same material. Alternatively, the support element 29 can also be multi-part or multi-piece. In this case, the support element 29 is constructed from a plurality of subassemblies or components.

The support element 29 extends in the longitudinal direction L into the inner vessel 6. The support element 29 is preferably arranged completely within the outer vessel 5. Viewed in the circumferential direction U, the entire circumference of the support element 29 is closed. The support element 29 is accommodated in the outer casing 21. This means in particular that the support element 29 is placed in the interior space 22. Preferably, the support element 29 is placed centrally with respect to the axis of symmetry 20 so that in the circumferential direction U a gap 31 filled with helium He is provided which extends completely around the support element 29. The gap 31 can have a gap width of 0.5 to 1 millimeters. The gap width is selected to be as small as possible and as large as necessary to allow the support element 29 with the heating element 30 to be inserted into the outer casing 21. The gap 31 is part of the interior space 22. The gap 31 is optional. Alternatively, the support element 29 can rest on the inside of the outer casing 21. The heat transfer can thereby be improved.

A cylindrical outer side 32 of the support element 29 faces the outer casing 21. The gap 31 is provided between the outer side 32 and the outer casing 21. On the outer side 32, a groove 33 is provided which runs in the circumferential direction U in a helical or spiral manner around the support element 29 and accommodates the heating element 30. The heating element 30 is preferably a heating wire which is wound onto the support element 29. In the event that the support element 29 is made of an electrically conductive material, the heating element 30 can have an electrical insulation which electrically insulates the heating element 30 from the support element 29. For example, the above-mentioned heating wire can be embedded in magnesium oxide powder which is encapsulated by a non-current-conducting metallic casing, for example a stainless steel casing. In this case, the term "heating element" can therefore be understood to mean a metallic-mineral-insulated heating wire. The groove 33 is optional. The heating element 30 can also be wound onto the support element 29 without the groove 33.

A cylindrical inner side 34 of the support element 29 faces away from the outer side 32. The inner side 34 runs in the circumferential direction U around the axis of symmetry 20. The inner side 34 can be realized by a hole led through the center of the support element 29. The heating element 30 has electrical connection lines 35, 36 which are led through the closure element 25 to an open-loop and closed-loop control device 37. The open-loop and closed-loop control device 37 can supply current to the heating element 30 and therefore control an amount of heat Q introduced into the hydrogen H2. The open-loop and closed-loop control device 37 can be part of the storage vessel 1 and/or the cryogen supply system 3.

The heating device 19 has at least one temperature sensor 38 which is coupled to the open-loop and closed-loop control device 37 by means of a sensor line 39. The temperature of the heating device 19 can be detected with the aid of the temperature sensor 38. The temperature sensor 38 can be part of a control circuit comprising the heating element 30, the open-loop and closed-loop control device 37 and the temperature sensor 38. The temperature sensor 38 comprises a fastening tab 40. As an alternative to the fastening tab 40, it is also possible to provide other fastening types, for example clamping, screwing, soldering or plugging.

The temperature sensor 38 is held or fastened with the aid of a fastening element 41. The fastening element 41 is made of a material with good heat conduction, for example a copper alloy or an aluminum alloy. The fastening element 41 is tubular. The fastening element 41 is arranged within the support element 29. For example, the fastening element 41 is pressed into the support element 29. The fastening element 41 can be an integral component, in particular a materially integral component. Alternatively, the fastening element 41 can also be multi-part or multi-piece.

The fastening element 41 is rotationally symmetrical in relation to axis of symmetry 20. The fastening element 41 comprises a cylindrical outer side 42 which rests against the inner side 34 of the support element 29. The fastening element 41 further comprises a cylindrical inner side 43, which is realized, for example, by a hole provided centrally in the fastening element 41. The helium He can therefore flow through the fastening element 41.

For each temperature sensor 38, the fastening element 41 has a receiving hole 44 into which the respective temperature sensor 38 is inserted. The receiving hole 44 is provided in the front side of the fastening element 41 and extends along the longitudinal direction L or along the x-direction x into the fastening element 41. The receiving hole 44 runs parallel to the axis of symmetry 20. The receiving hole 44 can be a blind hole. Viewed along the radial direction R, the receiving hole 44 lies directly below the outer side 42.

A heat transfer layer 45 is provided on the outer casing 21 and is attached to the outside of the outer casing 21. The heat transfer layer 45 can be made of copper. Aluminum alloys are also possible as suitable materials for the heat transfer layer 45. The heat transfer layer 45 can be a copper sheet or a copper plate. For example, the heat transfer layer 45 is wound onto the outer casing 21. The heat transfer layer 45 can be materially bonded to the outer casing 21. For example, the heat transfer layer 45 is soldered onto the outer casing 21.

The heat transfer layer 45 can also only be wound onto the outer casing 21 and not materially bonded thereto, wherein two end sections 46, 47 of the heat transfer layer 45 are clamped or screwed together in order to connect the heat transfer layer 45 to the outer casing 21. A first end section 46 and a second end section 47 abut one another and are connected to one another. The heat transfer layer 45 ensures uniform heat transfer. The previously mentioned heat transfer plate 27 can be molded onto the heat transfer layer 45. In this case, the heat transfer plate 27 is formed by means of the two interconnected end sections 46, 47 of the heat transfer layer 45.

However, the heat transfer plate 27 can also be a separate component which is connected to the outer casing 21 or the heat transfer layer 45. A plurality of such heat transfer plates 27 can be provided on the outer casing 21 or on the heat transfer layer 45. The heat transfer plate 27 can be materially bonded to the outer casing 21 or the heat transfer layer 45. For example, the heat transfer plate 27 is soldered or welded to the outer casing 21 or the heat transfer layer 45.

The heat transfer plate 27 ensures that when the liquid level of the hydrogen H2 in the storage vessel 1 is low, at least the heat transfer plate 27 protrudes into the liquid zone 17 of the hydrogen H2, and heat Q can therefore be transferred to the hydrogen H2. Preferably, at least one heat transfer plate 27 is attached between the outer casing 21 and the inner vessel 6. Any number of heat transfer plates 27 can be provided. The heat transfer plate 27 is preferably made of a metal material with good heat conduction, such as a copper alloy or an aluminum alloy.

Although the present invention has been described with reference to exemplary embodiments, it can be modified in many ways within the scope of the claims.

REFERENCE SIGNS USED

1 Storage vessel
2 Consumer
3 Cryogen supply system
4 Axis of symmetry
5 Outer vessel
6 Inner vessel
7 Vacuum space
8 Surroundings
9 Base section
10 Cover section
11 Cover section
12 Base section
13 Cover section
14 Cover section
15 Interior space
16 Gas zone
17 Liquid zone
18 Phase boundary
19 Heating device
20 Axis of symmetry
21 Outer casing 22 Interior space
23 Base section
24 End section
25 Closure element
26 End section
27 Heat transfer plate
28 Connection
29 Support element
30 Heating element
31 Gap
32 Outer side
33 Groove
34 Inner side
35 Connecting line
36 Connecting line
37 Open-loop and closed-loop control device
38 Temperature sensor
39 Sensor line
40 Fastening tab
41 Fastening element
42 Outer side
43 Inner side
44 Receiving hole
45 Heat transfer layer
46 End section
47 End section
g Direction of gravity
He Helium/medium
H2 Hydrogen/cryogen
L Longitudinal direction
Q Heat
R Radial direction
U Circumferential direction
x x direction
y y direction
z z direction

The invention claimed is:

1. A storage vessel for storing a cryogen, comprising:
- an inner vessel for receiving the cryogen,
- an outer vessel which surrounds the inner vessel, and
- a heating device, which is at least partially arranged within the inner vessel, for introducing heat into the cryogen,
- wherein the heating device has a heating element for generating heat and an outer casing which fluid-tightly surrounds an interior space of the heating device,
- wherein the heating element is accommodated within the interior space, and
- wherein the heating element has a heating wire which is embedded in a metal oxide which is encapsulated by a casing accommodated within the interior space.

2. The storage vessel according to claim 1, wherein the interior space is filled with a heat-conducting medium.

3. The storage vessel according to claim 1, wherein the heating device is guided from a surroundings of the storage vessel through the outer vessel and the inner vessel into a liquid zone surrounded by the inner vessel.

4. The storage vessel according to claim 3, wherein the outer casing is guided through the outer vessel and the inner vessel, and wherein the outer casing is connected to the outer vessel and the inner vessel by a material bond and/or by a form fit.

5. The storage vessel according to claim 3, wherein the outer casing has an end portion which projects into the surroundings and is closed fluid-tightly by a removable closure element, and wherein connecting lines of the heating element are led through the removable closure element.

6. The storage vessel according to claim 3, wherein the outer casing has a connection projecting into the surroundings and is in fluidic communication with the interior space, and wherein the connection is sealed fluid-tightly.

7. The storage vessel according to claim 1, wherein a heat transfer layer is provided on the outer casing and is attached to the outside of the outer casing.

8. The storage vessel according to claim 1, wherein the heating device has a support element which carries the heating element.

9. The storage vessel according to claim 8, wherein the support element has an outer side with a groove, running helically around the support element, in which the heating element is accommodated at least in portions.

10. The storage vessel according to claim 8, wherein a gap is provided between the support element and the outer casing and runs circumferentially around the support element.

11. The storage vessel according to claim 8, wherein the support element is tubular and has a cylindrical inner side.

12. The storage vessel according to claim 8, wherein the heating device has at least one temperature sensor which is arranged within the support element.

13. The storage vessel according to claim 12, wherein the heating device has a fastening element arranged within the support element for fastening the temperature sensor to the support element, and wherein the temperature sensor is inserted into the fastening element.

14. The storage vessel according to claim 13, wherein the fastening element is fluid-permeable.

15. A cryogen supply system for supplying a consumer with a cryogen, comprising at least one storage vessel according to claim 1.

16. The storage vessel according to claim 1, wherein the outer casing comprises a tubular base section, and the outer casing is provided with at least one heat transfer plate which extends in a radial direction away from the base tubular section.

17. A storage vessel for storing a cryogen, comprising:
- an inner vessel for receiving the cryogen,
- an outer vessel which surrounds the inner vessel, and
- a heating device, which is at least partially arranged within the inner vessel, for introducing heat into the cryogen,
- wherein the heating device has a heating element for generating heat and an outer casing which fluid-tightly surrounds an interior space of the heating device,
- wherein the heating element is accommodated within the interior space,
- wherein the heating element has a heating wire which is embedded in a metal oxide which is encapsulated by a casing accommodated within the interior space, and
- wherein the heating device has a support element which carries the heating element, and the support element has an outer side with a groove, running helically around the support element, in which the heating element is accommodated at least in portions.

18. A storage vessel for storing a cryogen, comprising:
- an inner vessel for receiving the cryogen,
- an outer vessel which surrounds the inner vessel, and
- a heating device, which is at least partially arranged within the inner vessel, for introducing heat into the cryogen,
- wherein the heating device has a heating element for generating heat and an outer casing which fluid-tightly surrounds an interior space of the heating device, wherein the heating element is accommodated within the interior space, wherein the heating element has a heating wire which is embedded in a metal oxide which is encapsulated by a casing accommodated within the interior space, and wherein the heating device has a support element which carries the heating element, and the heating device has at least one temperature sensor which is arranged within the support element.

* * * * *